United States Patent
Poster et al.

(10) Patent No.: US 11,643,197 B2
(45) Date of Patent: May 9, 2023

(54) REDUCED HEIGHT SWASHPLATE ASSEMBLY

(71) Applicant: Bell Helicopter Textron Inc., Forth Worth, TX (US)

(72) Inventors: Scott David Poster, Arlington, TX (US); Charles Hubert Speller, Flower Mound, TX (US); Mark Adam Wiinikka, Hurst, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 313 days.

(21) Appl. No.: 16/210,489

(22) Filed: Dec. 5, 2018

(65) Prior Publication Data

US 2020/0180757 A1 Jun. 11, 2020

(51) Int. Cl.
*B64C 27/605* (2006.01)
*F01D 5/02* (2006.01)

(52) U.S. Cl.
CPC .............. *B64C 27/605* (2013.01); *F01D 5/02* (2013.01)

(58) Field of Classification Search
CPC .......... B64C 27/605; B64C 2027/7238; B64C 2027/7255; B64C 11/32
See application file for complete search history.

(56) References Cited

U.S. PATENT DOCUMENTS

| 6,280,141 B1 | 8/2001 | Rampal et al. | |
| 6,325,326 B1 * | 12/2001 | Pancotti | B64C 27/605 244/17.25 |
| 8,142,158 B2 * | 3/2012 | Schmaling | B64C 27/605 416/149 |
| 8,961,138 B2 * | 2/2015 | Wiinikka | B64C 27/605 416/114 |
| 9,151,162 B2 * | 10/2015 | Thompson | F01D 5/02 |
| 2011/0097208 A1 * | 4/2011 | Girard | B64C 27/605 416/114 |

FOREIGN PATENT DOCUMENTS

FR 3019146 A1 10/2015

OTHER PUBLICATIONS

European Patent Office, Communication pursuant to Article 94(3) EPC for EP Appl. No. 19162455.0 dated Jun. 2, 2020, 7 pp.

(Continued)

*Primary Examiner* — Topaz L. Elliott
*Assistant Examiner* — Cameron A Corday
(74) *Attorney, Agent, or Firm* — Edwin S. Flores; Daniel J. Chalker; Chalker Flores, LLP

(57) ABSTRACT

A swashplate assembly includes: a mounting sleeve configured for coupling to and around an upper portion of a gearbox, wherein the mounting sleeve extends downwards from the upper portion of the gearbox; a tilt sleeve coupled to the mounting sleeve, wherein the tilt sleeve has a curved exterior surface; a non-rotating swashplate ring positioned around the tilt sleeve, wherein the non-rotating swashplate ring has a first set of pitch control connectors and an anti-rotation connector; a rotating swashplate ring rotatable about the non-rotating swashplate ring, wherein the rotating swashplate ring has a second set of pitch control connectors and a drive link connector; and a first bearing system mounted between the non-rotating swashplate ring and the rotating swashplate ring.

26 Claims, 8 Drawing Sheets

(56) References Cited

OTHER PUBLICATIONS

Bell Helicopter, Flight International "Bell 525 Relentless" Nov. 12, 2014.
Perry, Dominic "ANALYSIS: Bell 525 Relentless cutaway and technical Description" https://www.flightglobal.com/news/articles/analysis-bell-525-relentless-cutaway-and-technical-4055411, Source: Bell Helicopter,Flight International, London, Nov. 12, 2014, 8 pp.
European Patent Office, European Search Report for EP Appl. No. 19162455.0 dated Oct. 7, 2019, 4 pp.
European Patent Office, Communication pursuant to Article 94(3) EPC for EP Appl No. 19162455.0 dated Oct. 22, 2019, 8 pp.

\* cited by examiner

REDUCED HEIGHT SWASHPLATE ASSEMBLY

CROSS-REFERENCE TO RELATED APPLICATIONS

This patent application is related to U.S. provisional patent application Ser. No. 62/399,097 filed on Sep. 23, 2016 entitled "Improved Helicopter Transmission System" and U.S. provisional patent application Ser. No. 62/423,371 filed on Nov. 17, 2016 entitled "Improved Helicopter Transmission System," all of which are hereby incorporated by reference in their entirety.

STATEMENT OF FEDERALLY FUNDED RESEARCH

Not applicable.

TECHNICAL FIELD OF THE INVENTION

The present invention relates in general to the field of rotorcraft, and more particularly to systems and methods for reduced height swashplate assemblies.

BACKGROUND OF THE INVENTION

Without limiting the scope of the invention, its background is described in connection with rotorcraft swashplates.

Many swashplates are mounted to stationary support structures or sleeves that extend upwards from the top of a gearbox. Some swashplates reduce height of the rotor system by attaching the swashplate to sleeves coupled to and around the gearbox and eliminating non-rotating couplings, such as ball joints or scissor links, connected to the gearbox. But, these reduced height swashplates require more complex locking elements to prevent rotation of the fixed or non-rotating swashplate. In addition, these reduced height swashplates may require thicker gearbox casings for structural support of the swashplate.

For example, U.S. Pat. No. 8,961,138 discloses, in part, a sleeve coupled to and around a gearbox, and a mating element positioned outside the sleeve. The mating element and sleeve each have a plurality of grooves and ridges that mate with one another. A locking element prevents a first swashplate ring from rotating about the axis of the sleeve.

In another example, U.S. Pat. No. 9,151,162 discloses, in part, an anti-rotation sleeve for a swashplate that surrounds a drive shaft. The anti-rotation sleeve is coupled to or integrated into the upper portion of the gearbox. A pin and key mechanism is disposed at least partially through the anti-rotation sleeve and the non-rotating swashplate ring to prevent rotation of the non-rotating swashplate ring.

Systems and methods for providing reduced height swashplate assemblies in rotorcraft are desirable.

SUMMARY OF THE INVENTION

In some embodiments of the disclosure, a swashplate assembly comprises: a mounting sleeve configured for coupling to and around an upper portion of a gearbox, wherein the mounting sleeve extends downwards from the upper portion of the gearbox; a tilt sleeve coupled to the mounting sleeve, wherein the tilt sleeve has a curved exterior surface; a non-rotating swashplate ring positioned around the tilt sleeve, wherein the non-rotating swashplate ring has a first set of pitch control connectors and an anti-rotation connector; a rotating swashplate ring rotatable about the non-rotating swashplate ring, wherein the rotating swashplate ring has a second set of pitch control connectors and a drive link connector; and a first bearing system mounted between the non-rotating swashplate ring and the rotating swashplate ring. In one aspect, a flange extends outward from a lower portion of the mounting sleeve. In another aspect, an anti-rotation coupling is connected to the anti-rotation connector of the non-rotating swashplate ring and configured for attachment to the gearbox. In another aspect, a drive link coupling is connected to the drive link connector of the rotating swashplate ring and configured for attachment to a rotor hub assembly. In another aspect, the non-rotating swashplate ring is pivotable along the curved exterior surface of the tilt sleeve. In another aspect, the tilt sleeve has a curved inner surface and is coupled to the mounting sleeve only along a top of the tilt sleeve and a bottom of the tilt sleeve. In another aspect, the tilt sleeve is configured to slide axially relative to the mounting sleeve. In another aspect, the first set of pitch control connectors extend outwards from the non-rotating swashplate ring below the rotating swashplate ring; and the second set of pitch control connectors extend outwards from the rotating swashplate ring. In another aspect, a second bearing system is mounted between the tilt sleeve and the non-rotating swashplate ring. In another aspect, a third bearing system is mounted between the mounting sleeve and the tilt sleeve.

In some embodiments of the disclosure, a rotor system comprises: a gearbox; a rotor mast operably coupled to the gearbox and extending through a top of the gearbox; a rotor hub assembly connected to an upper portion of the rotor mast; a set of blades coupled to the rotor hub assembly; a mounting sleeve coupled to and around an upper portion of the gearbox, wherein the mounting sleeve extends downwards from the upper portion of the gearbox; a tilt sleeve coupled to the mounting sleeve, wherein the tilt sleeve has a curved exterior surface; a non-rotating swashplate ring positioned around the tilt sleeve; a rotating swashplate ring rotatable about the non-rotating swashplate ring; a first bearing system mounted between the non-rotating swashplate ring and the rotating swashplate ring; an anti-rotation coupling connected between the non-rotating swashplate ring and the gearbox; a set of pitch control actuators connected between the non-rotating swashplate ring and the gearbox; a drive link coupling connected between the rotating swashplate ring and the rotor hub assembly; and a set of pitch links connected between the rotating swashplate ring and the rotor hub assembly or the set of blades. In one aspect, a flange extends outward from a lower portion of the mounting sleeve. In another aspect, the non-rotating swashplate ring is pivotable along the curved exterior surface of the tilt sleeve. In another aspect, the tilt sleeve has a curved inner surface and is coupled to the mounting sleeve only along a top of the tilt sleeve and a bottom of the tilt sleeve. In another aspect, the tilt sleeve is configured to slide axially relative to the mounting sleeve. In another aspect, a second bearing system is mounted between the tilt sleeve and the non-rotating swashplate ring. In another aspect, a third bearing system is mounted between the mounting sleeve and the tilt sleeve.

In some embodiments of the disclosure, a method of controlling a set of rotor blades comprises: receiving a flight control input; moving a set of pitch control actuators based on the flight control input; and translating the movement of the set of pitch control actuators to the set of rotor blades using a swashplate assembly. The swashplate assembly comprises: a mounting sleeve coupled to and around an upper portion of a gearbox, wherein the mounting sleeve extends downwards from the upper portion of the gearbox; a tilt sleeve coupled to the mounting sleeve, wherein the tilt sleeve has a curved exterior surface; a non-rotating swashplate ring positioned around the tilt sleeve, wherein the non-rotating swashplate ring is coupled to the set of pitch control actuators; a rotating swashplate ring rotatable about the non-rotating swashplate ring; a first bearing system mounted between the non-rotating swashplate ring and the rotating swashplate ring; an anti-rotation coupling connected between the non-rotating swashplate ring and the gearbox; a drive link coupling connected between the rotating swashplate ring and the rotor hub assembly; and a set of pitch links connected between the rotating swashplate ring and the set of blades or a rotor hub assembly coupled to the set of blades. In one aspect, a flange extends outward from a lower portion of the mounting sleeve. In another aspect, the non-rotating swashplate ring is pivotable along the curved exterior surface of the tilt sleeve. In another aspect, the tilt sleeve has a curved inner surface and is coupled to the mounting sleeve only along a top of the tilt sleeve and a bottom of the tilt sleeve. In another aspect, the tilt sleeve is configured to slide axially relative to the mounting sleeve.

In addition to the foregoing, various other method, system, and apparatus aspects are set forth in the teachings of the present disclosure, such as the claims, text, and drawings forming a part of the present disclosure.

The foregoing is a summary and thus contains, by necessity, simplifications, generalizations, and omissions of detail. Consequently, those skilled in the art will appreciate that this summary is illustrative only and is not intended to be in any way limiting. There aspects, features, and advantages of the devices, processes, and other subject matter described herein will be become apparent in the teachings set forth herein.

BRIEF DESCRIPTION OF THE DRAWINGS

For a more complete understanding of the features and advantages of the present invention, reference is now made to the detailed description of the invention along with the accompanying figures, in which.

DETAILED DESCRIPTION OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
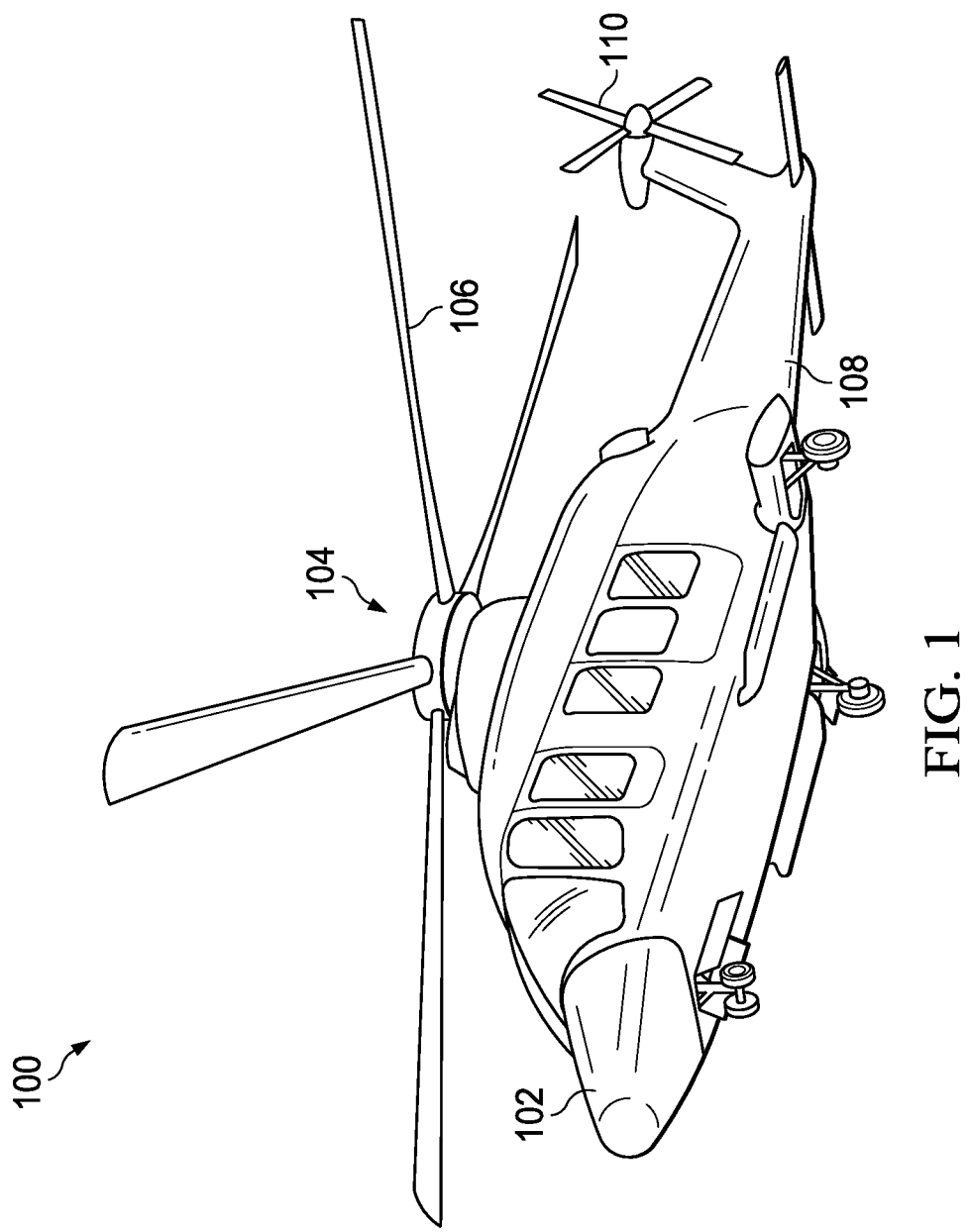
FIG. 1 shows a side view of a helicopter according to a particular embodiment of the present invention.

FIG. 1 shows an aircraft 100 in accordance with a preferred embodiment of the present application. In the exemplary embodiment, aircraft 100 is a helicopter having a fuselage 102 and a rotor system 104 carried thereon. A plurality of rotor blades 106 is operably associated with a rotor system 104 for creating flight. A tail boom 108 is depicted that further includes tail rotor 110.

Figure 2:
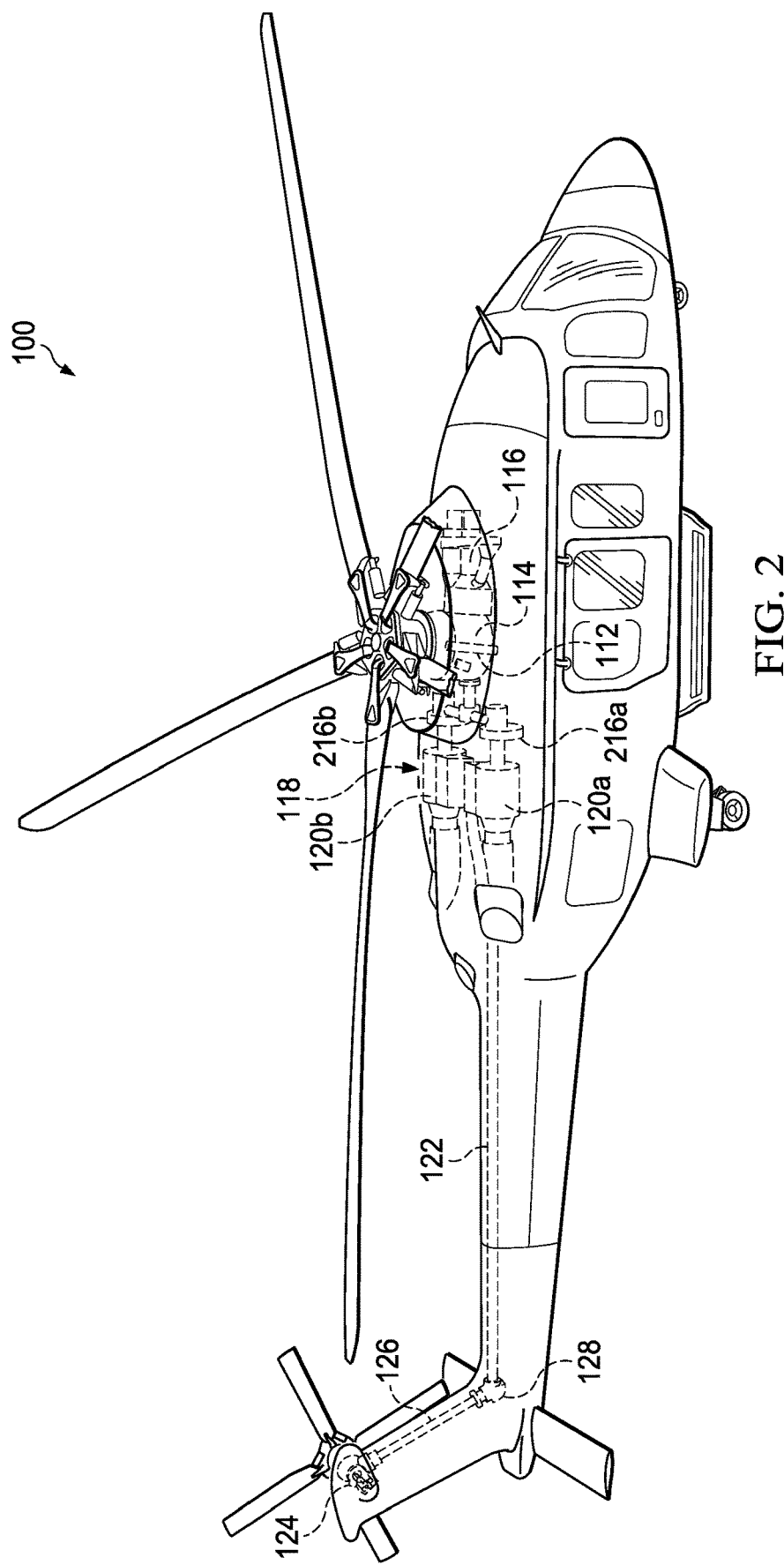
FIG. 2 shows a partial cross-section, perspective view of a helicopter according to an embodiment of the present invention.

For example, FIG. 2 shows a partial cross-section perspective view of aircraft 100 that includes additional detail of the present invention. Aircraft 100 further includes a rotor mast 112, which is connected to the main rotor gearbox (MRGB) 114. The MRGB 114 is connected to one or more accessory gear boxes 116 and one or more reduction gearboxes (RGB) 216a, 216b, hydraulic pump(s) and generator(s). Each RGB 216a, 216b is connected to one or more engines 120a, 120b, which are within an engine compartment 118. A tail rotor drive shaft 122 transmits mechanical rotation to the tail rotor gearbox 124, which is connected via tail rotor drive shaft 126 and intermediate gearbox 128.

Various embodiments of the present invention will now be described with respect to rotor system 104, rotor mast 112 and MRGB 114. Note that these are non-limiting examples and the swashplate assembly described herein is applicable to other types of gearboxes and rotor systems. Moreover, the embodiments described herein provide reduced height swashplate assemblies.

Figure 3:
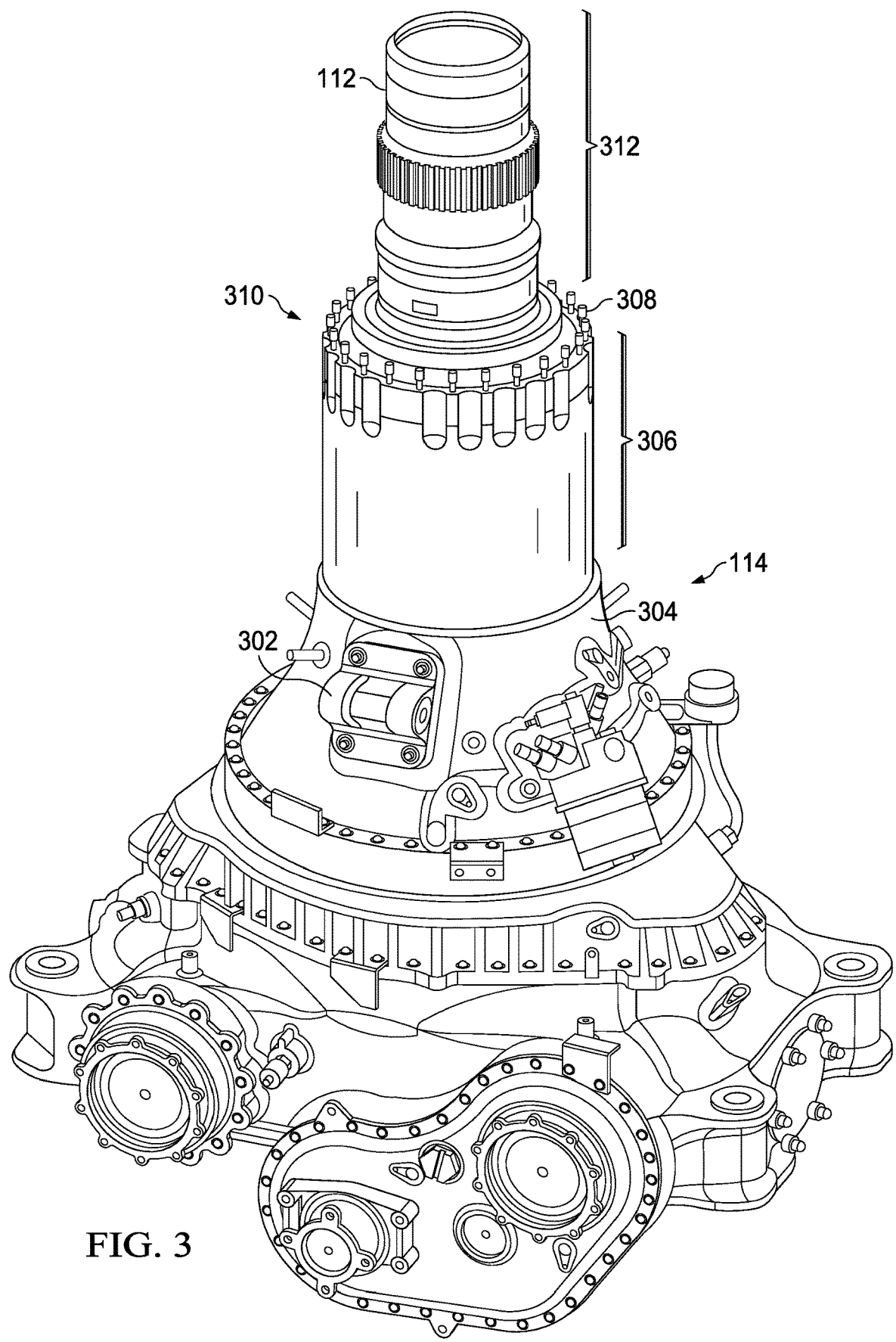
FIG. 3 shows a perspective view of a main rotor gearbox accordance with one embodiment of the present invention.
Figure 4:
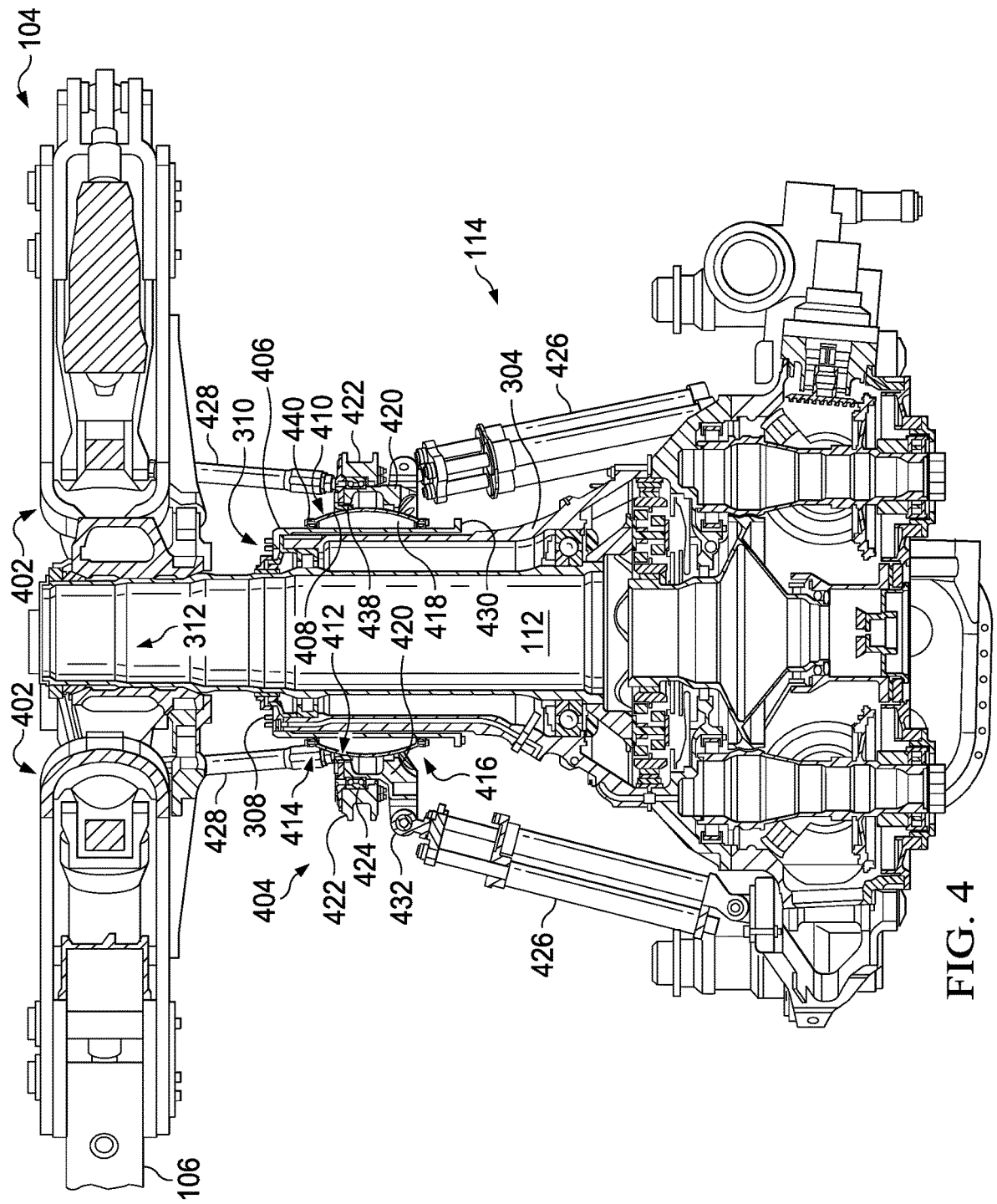
FIGS. 4-5 show cross-sectional views of a rotor system in accordance with one embodiment of the present invention.
Figure 5:
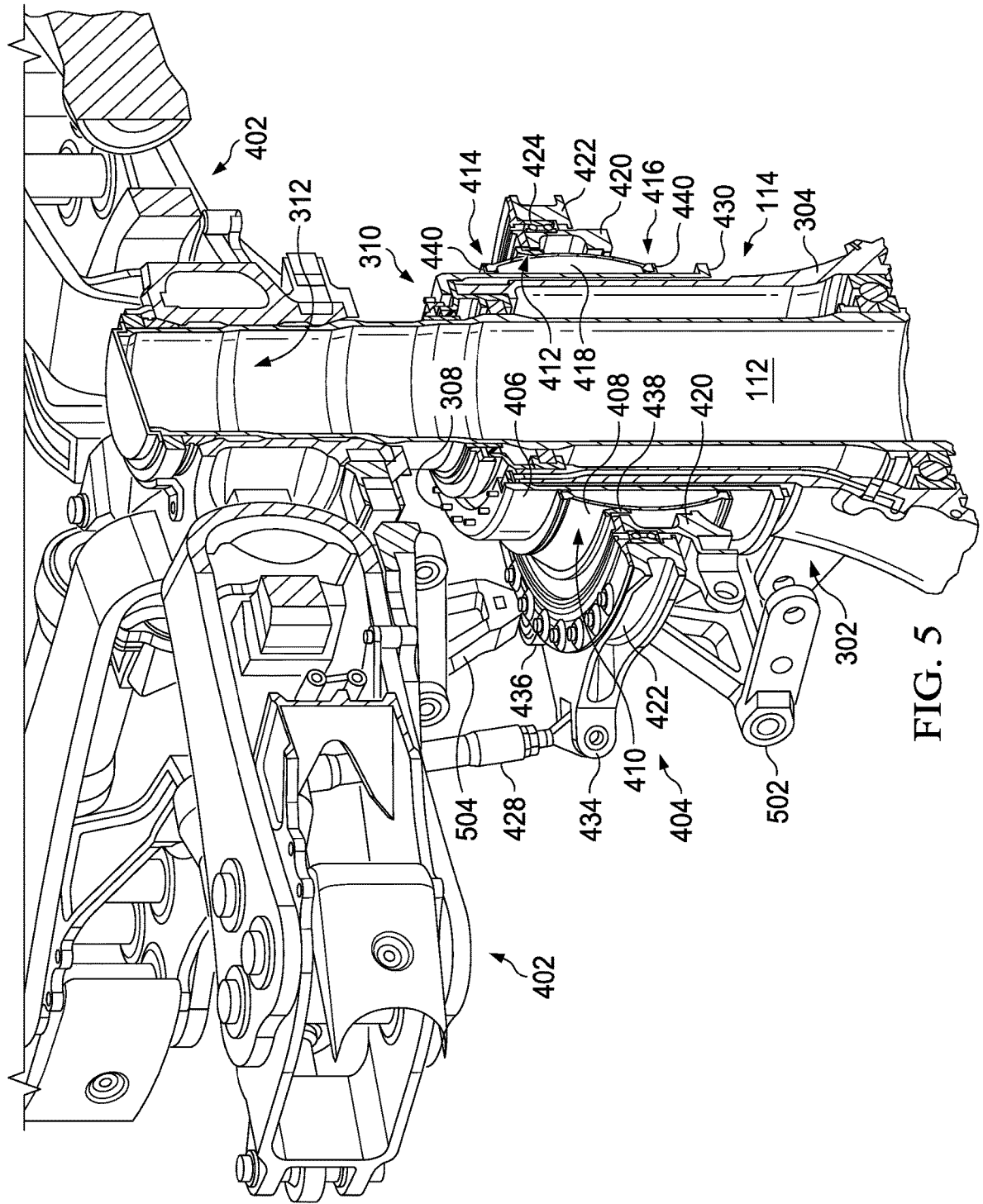

FIG. 3 shows a perspective view of a MRGB 114 in accordance with one embodiment of the present invention. MRGB 114 includes a mounting bracket 302 attached to the gearbox casing 304 that is used to connect an anti-rotation coupling, such as a ball joint or scissor link, to a non-rotating swashplate ring (see FIGS. 4-7). In addition, MRGB 114 includes a reduced diameter upper portion 306 and fasteners 308 at the top 310 of the MRGB 114 for coupling the swashplate assembly (see FIGS. 4-7) to and around the upper portion 306 of MRGB 114 (see FIGS. 4-7). Rotor mast 112 is operably coupled to MRGB 114 and extends through the top 310 of MRGB 114. As shown in FIGS. 4-5, a rotor hub assembly 402 is connected to an upper portion 312 of rotor mast 112.

FIGS. 4-5 show cross-sectional views of a rotor system 104 in accordance with one embodiment of the present invention. In some examples, rotor system 104 may include more or fewer components than shown in FIGS. 4-5. A rotor mast 112 is operably coupled to MRGB 114 and extends through the top 310 of MRGB 114. A rotor hub assembly 402 (e.g., yoke, blade grips, bearings, dampers, etc.) is connected to an upper portion 312 of the rotor mast 112 and a set of blades 106 are coupled to the rotor hub assembly 402. In some examples, the rotor hub assembly 402 may include more or fewer components or different components than shown in FIG. 4. Swashplate assembly 404 translates rotorcraft flight control input from the non-rotating fuselage into motion of the spinning blades 106.

Swashplate assembly 404 includes a mounting sleeve 406 coupling to and around an upper portion 306 (FIG. 3) of the MRGB 114. Mounting sleeve 406 extends downwards from the upper portion 306 (FIG. 3) of MRGB 114. In this non-limiting example, mounting sleeve 406 is attached to the top 310 of MRGB 114 with fasteners 308, and extends downwards from the top 310 of MRGB 114. A tilt sleeve 408 is coupled to mounting sleeve 406. Tilt sleeve 408 has a curved exterior surface 410 (e.g., substantially spherical, etc.), which is often referred to as a "tilt ball". In some embodiments, tilt sleeve 408 may include non-curved surfaces (not shown) above and/or below curved exterior surface 410. In this non-limiting example, tilt sleeve 408 has a curved inner surface 412 and is coupled to the mounting sleeve 406 only along a top 414 of the tilt sleeve 408 and a bottom 416 of the tilt sleeve 406. As a result, a void or gap 418 is created between mounting sleeve 406 and tilt sleeve 408, which reduces weight. A non-rotating swashplate ring 420 is positioned around the tilt sleeve 408, and a rotating swashplate ring 422 is rotatable about the non-rotating swashplate ring 420. A first bearing system 424 is mounted between the non-rotating swashplate ring 420 and the rotating swashplate ring 422. An anti-rotation coupling 502 (e.g., scissor link, etc.) is connected between the non-rotating swashplate ring 420 and the MRGB 114. A set of pitch control actuators 426 are connected between the non-rotating swashplate ring 420 and MRGB 114. A drive link coupling 504 (e.g., scissor link, etc.) is connected between the rotating swashplate ring 422 and the rotor hub assembly 402. A set of pitch links 428 connected between the rotating swashplate ring 422 and the rotor hub assembly 402 or the set of blades 106.

In operation, according to one example embodiment, tilt sleeve 408 is configured to slide axially relative to mounting sleeve 406, and non-rotating swashplate ring 420 is pivotable along the curved exterior surface 410 of tilt sleeve 408. As a result, translating the non-rotating swashplate ring 420 along the axis of rotor mast 112 causes the pitch links 428 to move up or down. This changes the pitch angle of all blades 106 equally, increasing or decreasing the thrust of the rotor and causing the aircraft 100 to ascend or descend. Tilting the non-rotating swashplate ring 420 causes the rotating swashplate 422 to tilt, moving the pitch links 428 up and down cyclically as they rotate with the rotor mast 112. This tilts the thrust vector of the rotor, causing the aircraft 100 to translate horizontally. Anti-rotation coupling 502 prevents rotation of non-rotating swashplate ring 420 about MRGB 114, while allowing non-rotating swashplate ring 420 to tilt. Anti-rotation coupling 502 may also allow the anti-rotation coupling to move longitudinally up and down, which may allow for longitudinal movement of non-rotating swashplate ring 420. In contrast, drive link coupling 504 causes rotation of rotating swashplate ring 422 about MRGB 114, while allowing rotating swashplate ring 422 to tilt.

Figure 6:
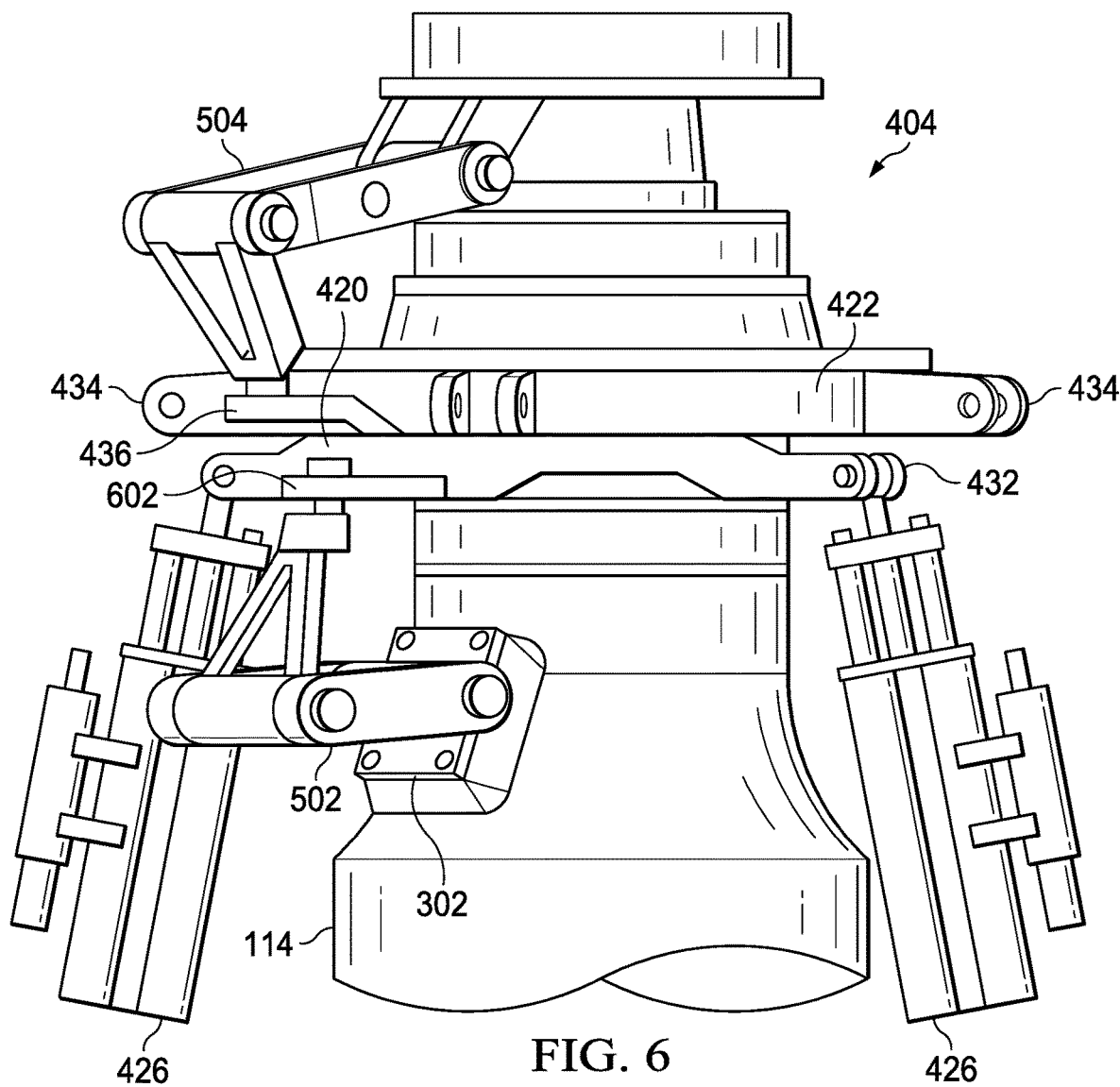
FIG. 6 shows a simplified view of the swashplate assembly in accordance with one embodiment of the present invention.

Now also referring to FIG. 6, a simplified view of the swashplate assembly 404 in accordance with one embodiment of the present invention is shown. The non-rotating swashplate ring 420 has a first set of pitch control connectors 432 and an anti-rotation connector 602. The first set of pitch control connectors 432 extend outwards from the non-rotating swashplate ring 420 below the rotating swashplate ring 422. The rotating swashplate ring 422 has a second set of pitch control connectors 434 and a drive link connector 436. The second set of pitch control connectors 434 extend outwards from the rotating swashplate ring 422. A second bearing system 438 is mounted between the tilt sleeve 408 and the non-rotating swashplate ring 420. A third bearing system 440 is mounted between the mounting sleeve 406 and the tilt sleeve 408. In some embodiments, bearing systems 424, 438 and 440 may prevent the swashplate components from wearing against one another and can be made of any suitable bearing materials and components. In other embodiment, wear-resistant and/or friction-reducing coatings may also be used.

Figure 7:
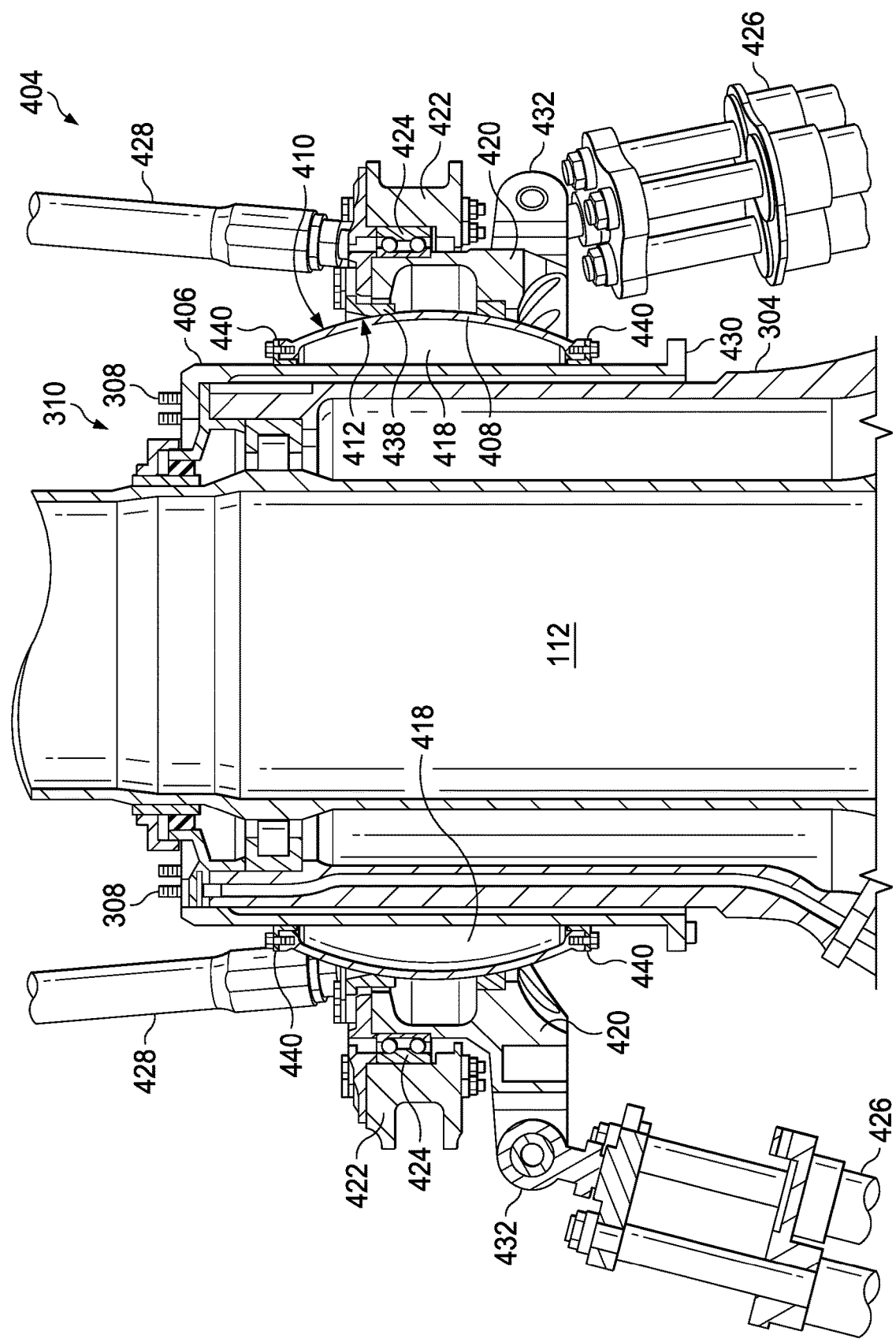
FIG. 7 shows a cross-sectional view of a swashplate assembly in accordance with one embodiment of the present invention.

Now also referring to FIG. 7, a cross-sectional view of a swashplate assembly 404 in accordance with one embodiment of the present invention is shown. Swashplate assembly 404 includes a mounting sleeve 406 configured for coupling to and around an upper portion 306 of a gearbox 114. The mounting sleeve 406 extends downwards from the upper portion 306 of the gearbox 114. A tilt sleeve 408 is coupled to the mounting sleeve 406. The tilt sleeve 408 has a curved exterior surface 410. A non-rotating swashplate ring 420 is positioned around the tilt sleeve 408. The non-rotating swashplate ring 420 has a first set of pitch control connectors 432 and an anti-rotation connector 602 (see FIG. 6). A rotating swashplate ring 422 is rotatable about the non-rotating swashplate ring 420. The rotating swashplate ring 422 has a second set of pitch control connectors 434 and a drive link connector 436 (see FIGS. 5 and 6). A first bearing system 424 is mounted between the non-rotating swashplate ring 420 and the rotating swashplate ring 422.

In some embodiments, a flange 430 extends outward from a lower portion of the mounting sleeve 406, which can act as a stop to prevent tilt sleeve 408 from disengaging from mounting sleeve 406 and damaging gearbox casing 304. An anti-rotation coupling 502 can be connected to the anti-rotation connector 602 of the non-rotating swashplate ring 420 and configured for attachment to the gearbox 114 via mounting bracket 302. A drive link coupling 504 can be connected to the drive link connector 436 of the rotating swashplate ring 422 and configured for attachment to a rotor hub assembly 402. The non-rotating swashplate ring 420 is pivotable along the curved exterior surface 410 of the tilt sleeve 408. The tilt sleeve 408 can have a curved inner surface 420 and can be coupled to the mounting sleeve 406 only along a top 414 of the tilt sleeve 408 and a bottom 416 of the tilt sleeve 408. The tilt sleeve 408 can be configured to slide axially relative to the mounting sleeve 406. The first set of pitch control connectors 432 extend outwards from the non-rotating swashplate ring 420 below the rotating swashplate ring 422, and the second set of pitch control connectors 434 extend outwards from the rotating swashplate ring 422. A second bearing system 438 can be mounted between the tilt sleeve 408 and the non-rotating swashplate ring 420. A third bearing system 440 can be mounted between the mounting sleeve 406 and the tilt sleeve 408. Note that the swashplate assembly 404 may include any or all of the features previously described in reference to FIGS. 4-6.

Figure 8:
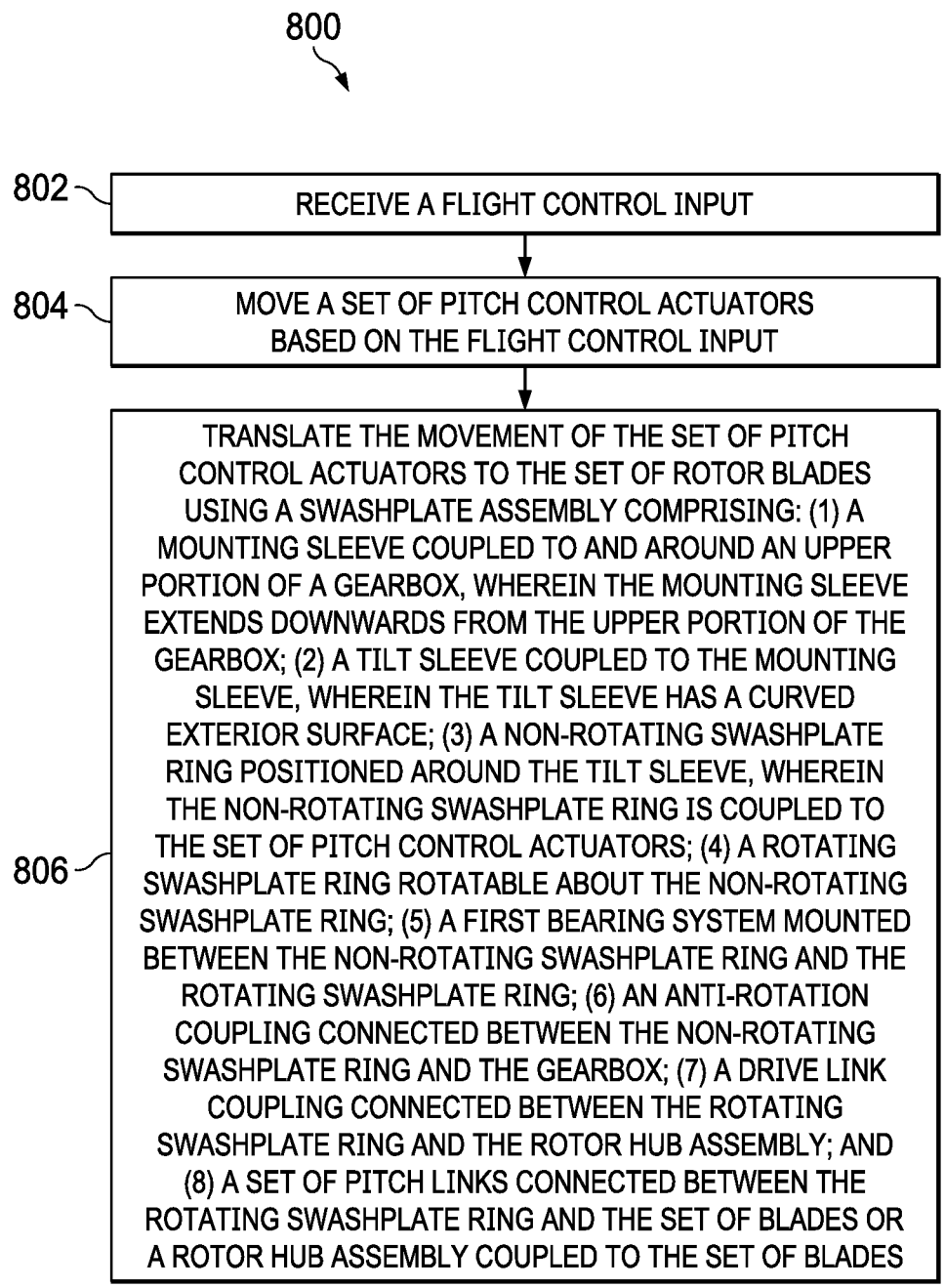
FIG. 8 is a flowchart of a method for controlling a set of rotor blades in accordance with one embodiment of the present invention.

FIG. 8 is a flowchart of a method 800 for controlling a set of rotor blades in accordance with one embodiment of the present invention. A flight control input is received in block 802. A set of pitch control actuators are moved based on the flight control input in block 804. The movement of the set of pitch control actuators is translated to the set of rotor blades using a swashplate assembly in block 806. The swashplate assembly includes: (1) a mounting sleeve coupled to and around an upper portion of a gearbox, wherein the mounting sleeve extends downwards from the upper portion of the gearbox; (2) a tilt sleeve coupled to the mounting sleeve, wherein the tilt sleeve has a curved exterior surface; (3) a non-rotating swashplate ring positioned around the tilt sleeve, wherein the non-rotating swashplate ring is coupled to the set of pitch control actuators; (4) a rotating swashplate ring rotatable about the non-rotating swashplate ring; (5) a first bearing system mounted between the non-rotating swashplate ring and the rotating swashplate ring; (6) an anti-rotation coupling connected between the non-rotating swashplate ring and the gearbox; (7) a drive link coupling connected between the rotating swashplate ring and the rotor hub assembly; and (8) a set of pitch links connected between the rotating swashplate ring and the set of blades or a rotor hub assembly coupled to the set of blades. Note that the swashplate assembly may include any or all of the features previously described in reference to FIGS. 4-7.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications, patents and patent applications mentioned in the specification are indicative of the level of skill of those skilled in the art to which this invention pertains. All publications, patents and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of." As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step, or a limitation) or group of integers (e.g., feature(s), element(s), characteristic(s), property(ies), method/process(s) steps, or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about," "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of particular embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope, and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A swashplate assembly configured for coupling to a gearbox comprising a gearbox casing and a reduced diameter upper portion extending upwards from the gearbox casing, the swashplate assembly comprising:
   a mounting sleeve configured for attachment to a top of the reduced diameter upper portion of the gearbox using fasteners and disposed around the reduced diameter upper portion of the gearbox, wherein the mounting sleeve extends downwards from the top of the reduced diameter upper portion of the gearbox;
   a tilt sleeve coupled to the mounting sleeve, wherein the tilt sleeve has a curved exterior surface;
   a non-rotating swashplate ring positioned around the tilt sleeve, wherein the non-rotating swashplate ring has a first set of pitch control connectors and an anti-rotation connector, wherein the anti-rotation connector is configured for coupling to the gearbox casing below the mounting sleeve and the reduced diameter upper portion of the gearbox;
   a rotating swashplate ring rotatable about the non-rotating swashplate ring, wherein the rotating swashplate ring has a second set of pitch control connectors and a drive link connector, wherein the drive link connector is configured for coupling to a rotor hub assembly; and
   a first bearing system mounted between the non-rotating swashplate ring and the rotating swashplate ring.

2. The swashplate assembly of claim 1, further comprising a flange extending outward from a lower portion of the mounting sleeve.

3. The swashplate assembly of claim 1, further comprising an anti-rotation coupling connected to the anti-rotation connector of the non-rotating swashplate ring and configured for attachment to the gearbox casing below the mounting sleeve and the reduced diameter upper portion of the gearbox.

4. The swashplate assembly of claim 1, further comprising a drive link coupling connected to the drive link connector of the rotating swashplate ring and configured for attachment to a rotor hub assembly.

5. The swashplate assembly of claim 1, wherein the non-rotating swashplate ring is pivotable along the curved exterior surface of the tilt sleeve.

6. The swashplate assembly of claim 1, wherein the tilt sleeve has a curved inner surface and is coupled to the mounting sleeve only along a top of the tilt sleeve and a bottom of the tilt sleeve.

7. The swashplate assembly of claim 1, wherein the tilt sleeve is configured to slide axially relative to the mounting sleeve.

8. The swashplate assembly of claim 1, wherein:
   the first set of pitch control connectors extend outwards from the non-rotating swashplate ring below the rotating swashplate ring; and
   the second set of pitch control connectors extend outwards from the rotating swashplate ring.

9. The swashplate assembly of claim 1, further comprising a second bearing system mounted between the tilt sleeve and the non-rotating swashplate ring.

10. The swashplate assembly of claim 1, further comprising a third bearing system mounted between the mounting sleeve and the tilt sleeve.

11. A rotor system comprising:
   a gearbox comprising a gearbox casing and a reduced diameter upper portion extending upwards from the gearbox casing;
   a rotor mast operably coupled to the gearbox and extending through a top of the reduced diameter upper portion of the gearbox;
   a rotor hub assembly connected to an upper portion of the rotor mast;
   a set of blades coupled to the rotor hub assembly;
   a mounting sleeve attached to a top of the reduced diameter upper portion of the gearbox using fasteners and disposed around the reduced diameter upper portion of the gearbox, wherein the mounting sleeve extends downwards from the top of the reduce diameter upper portion of the gearbox;
   a tilt sleeve coupled to the mounting sleeve, wherein the tilt sleeve has a curved exterior surface;
   a non-rotating swashplate ring positioned around the tilt sleeve;
   a rotating swashplate ring rotatable about the non-rotating swashplate ring;
   a first bearing system mounted between the non-rotating swashplate ring and the rotating swashplate ring;
   an anti-rotation coupling connected between the non-rotating swashplate ring and the gearbox casing below the mounting sleeve and the reduced diameter upper portion of the gearbox;
   a set of pitch control actuators connected between the non-rotating swashplate ring and the gearbox casing;
   a drive link coupling connected between the rotating swashplate ring and the rotor hub assembly; and
   a set of pitch links connected between the rotating swashplate ring and the rotor hub assembly or the set of blades.

12. The rotor system of claim 11, further comprising a flange extending outward from a lower portion of the mounting sleeve.

13. The rotor system of claim 11, wherein the non-rotating swashplate ring is pivotable along the curved exterior surface of the tilt sleeve.

14. The rotor system of claim 11, wherein the tilt sleeve has a curved inner surface and is coupled to the mounting sleeve only along a top of the tilt sleeve and a bottom of the tilt sleeve.

15. The rotor system of claim 11, wherein the tilt sleeve is configured to slide axially relative to the mounting sleeve.

16. The rotor system of claim 11, further comprising a second bearing system mounted between the tilt sleeve and the non-rotating swashplate ring.

17. The rotor system of claim 11, further comprising a third bearing system mounted between the mounting sleeve and the tilt sleeve.

18. The rotor system of claim 11, further comprising:
   a first set of pitch control connectors coupling the non-rotating swashplate ring to the set of pitch control actuators, wherein the first set of pitch control connectors extend outwards from the non-rotating swashplate ring below the rotating swashplate ring; and
   a second set of pitch control connectors coupling the rotating swashplate ring to the set of pitch links, wherein the second set of pitch control connectors extend outwards from the rotating swashplate ring.

19. A method of controlling a set of rotor blades comprising:
receiving a flight control input;
moving a set of pitch control actuators based on the flight control input; and
translating the movement of the set of pitch control actuators to the set of rotor blades using a swashplate assembly coupled to a gearbox comprising a gearbox casing and a reduced diameter upper portion extending upwards from the gearbox casing, wherein the swashplate assembly comprises:
a mounting sleeve attached to a top of the reduced diameter upper portion of the gearbox using fasteners and disposed around the reduced diameter upper portion of the gearbox, wherein the mounting sleeve extends downwards from the top of the reduced diameter upper portion of the gearbox,
a tilt sleeve coupled to the mounting sleeve, wherein the tilt sleeve has a curved exterior surface,
a non-rotating swashplate ring positioned around the tilt sleeve, wherein the non-rotating swashplate ring is coupled to the set of pitch control actuators,
a rotating swashplate ring rotatable about the non-rotating swashplate ring,
a first bearing system mounted between the non-rotating swashplate ring and the rotating swashplate ring,
an anti-rotation coupling connected between the non-rotating swashplate ring and the gearbox casing below the mounting sleeve and the reduced diameter upper portion of the gearbox,
a drive link coupling connected between the rotating swashplate ring and the rotor hub assembly, and
a set of pitch links connected between the rotating swashplate ring and the set of blades or a rotor hub assembly coupled to the set of blades.

20. The method of claim 19, further comprising a flange extending outward from a lower portion of the mounting sleeve.

21. The method of claim 19, wherein the non-rotating swashplate ring is pivotable along the curved exterior surface of the tilt sleeve.

22. The method of claim 19, wherein the tilt sleeve has a curved inner surface and is coupled to the mounting sleeve only along a top of the tilt sleeve and a bottom of the tilt sleeve.

23. The method of claim 19, wherein the tilt sleeve is configured to slide axially relative to the mounting sleeve.

24. The method of claim 19, wherein:
a first set of pitch control connectors coupling the non-rotating swashplate ring to the set of pitch control actuators, wherein the first set of pitch control connectors extend outwards from the non-rotating swashplate ring below the rotating swashplate ring; and
a second set of pitch control connectors coupling the rotating swashplate ring to the set of pitch links, wherein the second set of pitch control connectors extend outwards from the rotating swashplate ring.

25. The method of claim 19, further comprising a second bearing system mounted between the tilt sleeve and the non-rotating swashplate ring.

26. The method of claim 19, further comprising a third bearing system mounted between the mounting sleeve and the tilt sleeve.

* * * * *